_United States Patent_ [19]

Morikawa

[11] Patent Number: 4,572,696

[45] Date of Patent: Feb. 25, 1986

[54] WEIGHTED CABLE CAP

[75] Inventor: Toyohiko Morikawa, Takarazuka, Japan

[73] Assignee: Nippon Cable System Inc., Hyogo, Japan

[21] Appl. No.: 418,036

[22] Filed: Sep. 14, 1982

[30] Foreign Application Priority Data

Jun. 24, 1982 [JP]   Japan ................................. 57-109263

[51] Int. Cl.⁴ ............................................... B25G 3/34
[52] U.S. Cl. ...................................... 403/265; 464/180
[58] Field of Search ............... 403/265, 267; 464/180, 464/185; 285/239

[56]  References Cited

U.S. PATENT DOCUMENTS 3,779,451  12/1973  Lehman ......................... 464/180 X

FOREIGN PATENT DOCUMENTS 155816  2/1922  United Kingdom ................ 403/267
308381  3/1929  United Kingdom ................ 403/267

Primary Examiner—Dave W. Arola
Attorney, Agent, or Firm—Armstrong, Nikaido, Marmelstein & Kubovcik

[57]  ABSTRACT

A weighted cable cap, comprising a cable cap provided on one end thereof with a hole-W for inserting an outer casing, having a bottom, and on the other end thereof with a hole-X for inserting an inner cable; the hole-X being perforated through the bottom so that the hole-W and hole-X are concentrically located each other; and a weight having a hole-Y for inserting the outer casing and being fixed on one end of the cable cap so that the hole-W and hole-Y are concentrically located each other, whereby vibration transmitted to the control cable from external is favorably prevented.

8 Claims, 4 Drawing Figures

WEIGHTED CABLE CAP

BACKGROUND OF THE INVENTION

The present invention relates to a novel weighted cable cap and a process for preparing the same. More particularly, the present invention relates to a weighted cable cap in which vibration transmitted to the control cable from external is favorably prevented, and a process for preparing the same.

Hitherto, for remote control in various industrial machines and equipments, particularly a passive device, e.g. a transmission, a brake, a clutch, a speed meter, or the like, as used in an automobile, an autocycle, a bicycle, or the like, there has been employed a control cable comprising a flexible outer casing and an inner cable. This control cable is employed for remote control of the passive device through the inner cable which slides forward or backward or rotates in the outer casing. Also, the outer casing of the control cable is securely connected with an opposite member (e.g. a passive device, a control lever, or the like) by a cable cap in order to accurately guide the inner cable which is operated by the force of push, pull or rotaion. Therefore, a vibration resulting from operation of an engine or a vibration which an automobile receives in running is transmitted to the control cable through the cable cap and the control cable is vibrated. As a result, the outer casing breaks by repeated bend or breaks down by fatigue at the portion which is connected with the cable cap, or wears by contacting with other parts. Further, the above breakage or wearing of the outer casing affect people's lives, because the brake or the clutch of an automobile tends to become inoperatable. Furthermore, the vibration is transmitted to the operating pannel through the control cable and causes relaxation in operating apparatus and a noise generated by the vibration gives uncomfortableness to passengers. In order to prevent the above-mentioned vibration of the control cable, there is proposed a method in which the control cable is fixed at several portions to other objects such as the body of automobiles. However, such a method is complicated because of fastening at several portions. Furthermore, this method has disadvantages that the vibration of the control cable between the fixed portion thereof and the cable cap cannot be effectively prevented and that the above-mentioned damage of the outer casing canot be effectively prevented at a portion which is connected with the cable cap.

OBJECT OF THE INVENTION

An object of the present invention is to provide a weighted cable cap which can prevent favorably the vibration of a control cable and a process for preparing the same.

The other object of the invention is to provide a weighted cable cap that can be easily manufactured and is capable of being easily fixed to a body of an automobile and a process for preparing the same.

Other objects and advantages of the invention will become apparent from the following description with reference to the accompanying drawings.

DETAILED EXPLANATION OF THE INVENTION

Figure 1:
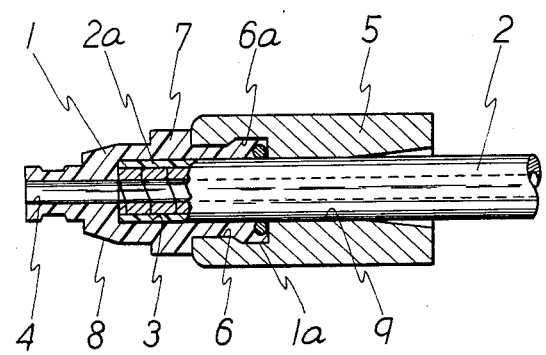
FIG. 1 is a sectional view for showing an embodiment of a weighted cable cap of the present invention.

In FIG. 1, 1 is a cable cap. 2 is an outer casing of a control cable. A hole-W 3 for inserting one end of the outer casing 2 is provided on one end of the cable cap 1. The hole-W 3 has a bottom. A hole-X 4 for inserting an inner cable is perforated through the bottom of the hole-W 3 to the other end of the cable cap 1. The hole-W 3 and the hole-X 4 are concentrically provided on the cable cap 1.

A weight 5 has almost cylindrical shape. A hole-Z 6 for fitly inserting one end of the cable cap 1 is provided in the weight 5. The hole-Z 6 has a bottom. An inside diameter of the portion 6a of the hole-Z 6 is expanded. An outside diameter of the portion 1a of the cable cap 1 is expanded. The expanded portion 6a is securely engaged with the expanded portion 1a. A flange 7 is formed on the outer surface of the cable cap 1. One surface of the flange 7 is closely applied to the surface of one end of the weight 5. The weight 5 can be more securely combined with the cable cap 1 by means of the hole-Z 6, the expanded portion 6a, the flange 7, or the like. The other end 8 of the cable cap 1 comprising the other surface of the flange 7 is formed in a known shape so as to combine securely with an object member.

A hole-Y 9 for inserting the outer casing 2 is provided on the weight 5. The hole-Y 9 is perforated through the bottom of the hole-Z 6 to the other end of the weight 5. The hole-Y 9 and the hole-Z 6 are concentrically provided. The inside diameter of the hole-Y 9 is almost equal to the outside diameter of the outer casing 1 in a certain area of the hole-Y 9. The inside diameter of the hole-Y 9 is gradually expanded from the area of the hole-Y 9 in which the inside diameter of the hole-Y 9 is almost equal to the outside diameter of the outer casing 1, to the other end of the weight 5. Since hole-Y 9 is formed as in above-mentioned, the hole-Y 9 can contact a wide area of the outer casing 2 to support the casing 2. Whereby the generation of a concentrated bending load or an acute angled bend to the outer casing 2 can be prevented.

In the weighted cable cap of the invention, the cable cap can be formed by the same method that a conventional cable cap can be formed. The weight is formed from a metal having a high specific gravity such as lead, a lead alloy, or the like by molding, forging, cutting, or the like. The weighted cable cap of the invention can be formed by fixing the weight to the cable cap by means of known method of screwing, adhering, or the like. The weighted cable cap so formed can be fixed on one end of the outer casing 2. However, the weighted cable cap of the invention can be more easily formed with high accuracy the the following method.

First, in manufacturing step of parts, an outer casing 2 and a weight 5 made of lead, a lead alloy, or the like, are respectively formed.

Figure 2:
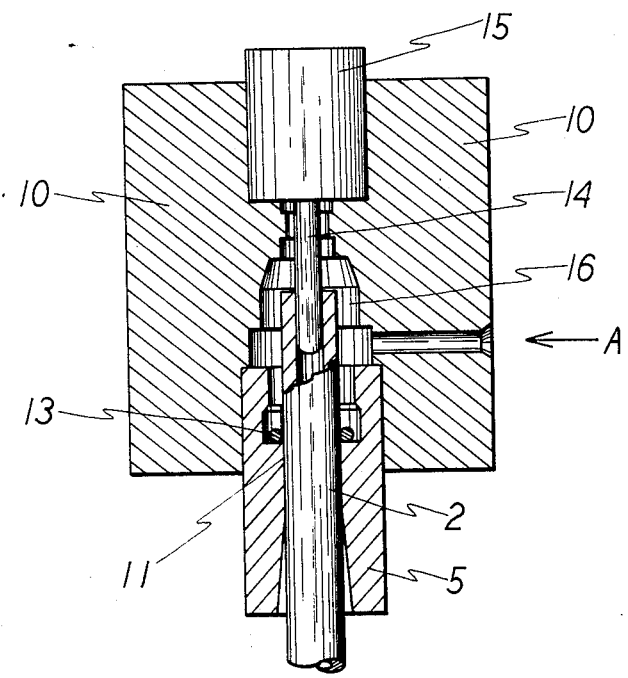
FIG. 2 is a schematically sectional view for showing a setting step in a process for preparing a weighted cable cap of the present invention.

Next, as shown in FIG. 2, the outer casing 2 is inserted into the hole-Y 9 of the weight 5 and they are arranged in a split mold 10 which has the space for forming a cable cap 1. At that time, it is desirable that an O-ring 13 is set outside the outer casing 2, so that molten resin cannot ooze through a gap 11 between the outer casing 2 and the weight 5. In case that the outer casing 2 comes closely in contact with the inner surface of the weight 5, there is no need for setting the O-ring outside the outer casing 2.

Furthermore, a core mold 15 having a core 14 for forming the hole-X 4 for inserting an inner cable is set in the split mold 10, and a cavity 16 is formed in the split mold 10. Whereby, a setting step is completed.

Next, molten resin is poured into the cavity 16 as shown by an arrow A, and then is solidified. Whereby, the weight 5 and the outer casing 2 are fixed to the cable cap 1 as one body. As a result, a molting step is completed.

Figure 3:
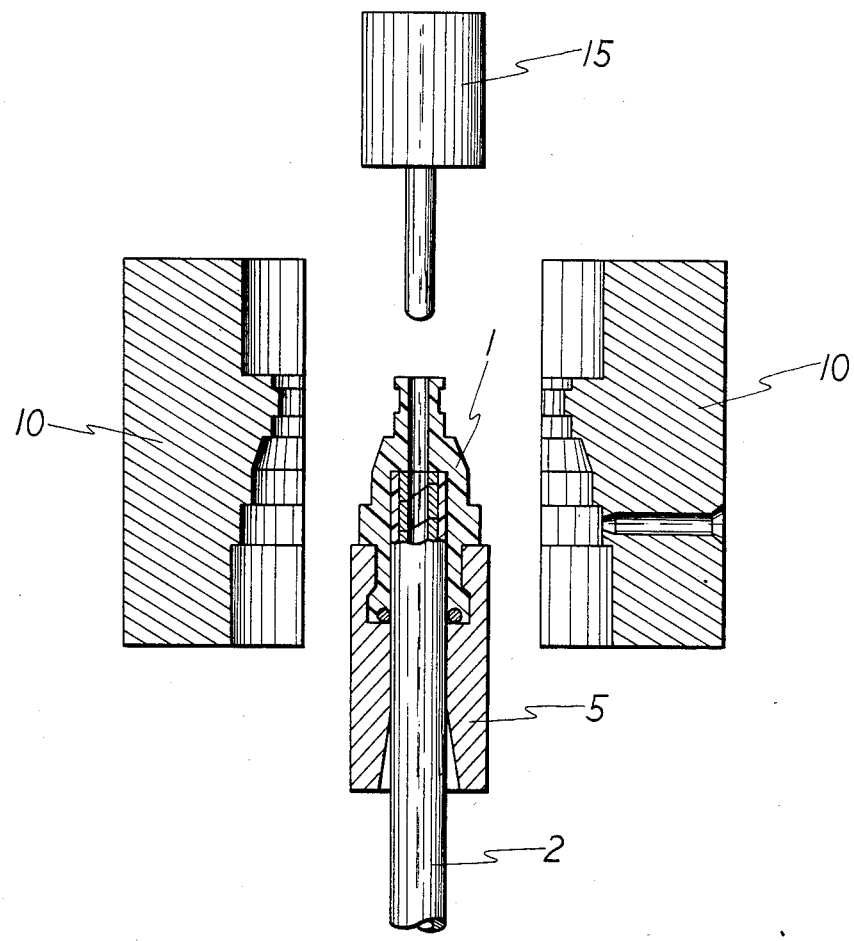
FIG. 3 is a schematically sectional view for showing a step in which a split mold and a core mold are separated in a process for preparing a weighted cable cap of the present invention.

Finally, the completed weighted cable cap, to which the outer casing 2 is fixed, is obtained by separating the split mold 10 and the core mold 15, as shown in FIG. 3.

In the weighted cable cap structured as above, the hole-W 3 of the cable cap 1 is molded by employing one end of the outer casing 2 as a male mold. Whereby the outer casing 2, in spite of an error of the outer diameter thereof, can be closely fitted into the hole-W 3. Further, the cable cap 1 is securely fixed to the outer casing 2 by adhesion of two kinds of resin, i.e. a resin layer 2a of the surface of the outer casing 2 and a resin of which the cable cap 1 is made.

Also, since the hole-Z 6 of the weight 5 and the portion 6a are filled up with molten resin, the cable cap 1 is securely fixed to the weight 5.

Material of the weight which is employed in the weighted cable cap of the present invention is not especially limited. However, it is desirable that the weight is made of the metal having a high specific gravity such as lead, a lead alloy, or the like. Also, in case that the process of the present invention is employed, since the materials of the weight must be those which are not attached by molten resin, it is desirable that the weight is made of the above mentioned metal. Furthermore, a size of the weight as well as a weight thereof can be optionally selected according to the situation of the vibration given to the control cable from the outside.

Figure 4:
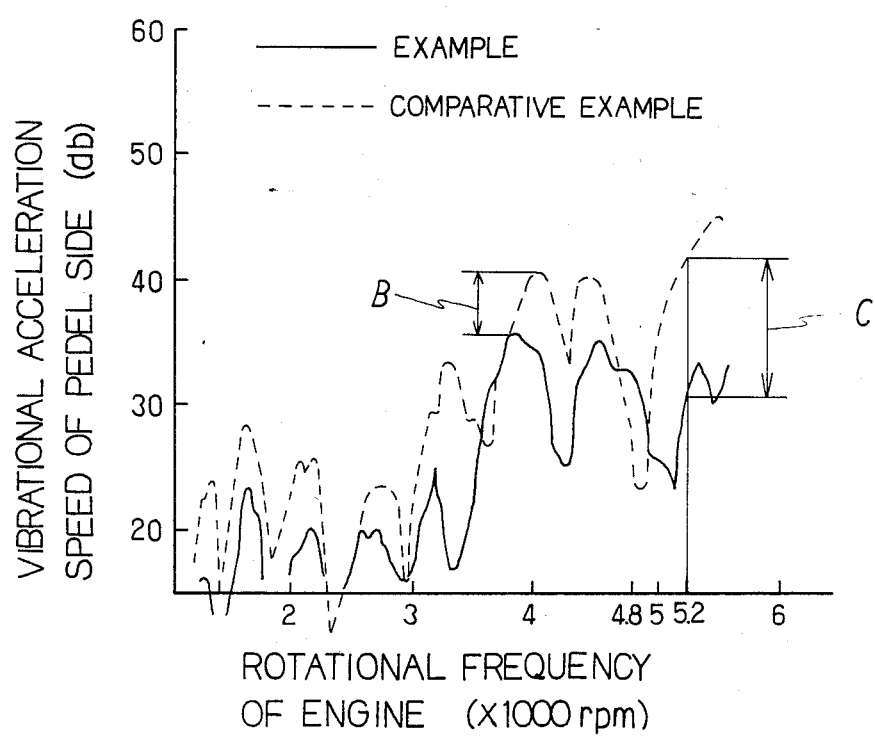
FIG. 4 is a graph for showing a damping effect of vibration of a weighted cable cap of the present invention.

Next, a damping effect of vibration of the weighted cable cap of the present invention is explained on the basis of Example and Comparative Example. In Example, the control cable having on its one end the weighted cable cap of FIG. 1 was employed, and in Comparative Example, the same control cable as used in Example except that the weight is not provided was employed. One end of the inner cable and one end of the outer casing in Example and Comparative Example, respectively, were fixed to a member being vibrated by the operation of an engine. The other end of the inner cable was fixed to a control pedal, and the other end of the outer casing was fixed to a flame. By a measuring device so structured, the vibration transmitted to the pedal side was measured over the whole range of rotational frequency of the engine. The result of the measurement is shown in FIG. 4. In FIG. 4, an axis of abscissa shows the rotational frequency of the engine, and an axis of the ordinate shows the vibrational acceleration speed of the pedal side. Further, the vibrational acceleration speed of the axis of ordinate is shown in logarithmic indication (i.e. 1 G=60 db). The result of the measurement of Example is shown in a full line and that of Comparative Example is shown in a dashed line. According to the result of the measurement, the vibrational acceleration speed of Example is smaller than that of Comparative Example over the whole range of the rotational frequency of the engine including the rotational frequency of idling of the engine (i.e. 0 to 3000 r.p.m.). Particularly in the range of usual use (i.e. when the rotational frequency of the engine is from 3000 to 4800 r.p.m.), as shown by arrow B of FIG. 4, the vibrational acceleration speed of the Example is approximately fifty percent (6 db) of that of Comparative Example. Also, in the time of maximum output of the engine (i.e. when the rotational frequency of the engine is 5200 r.p.m.), as shown by an arrow C of FIG. 4, vibrational acceleration speed of Example is approximately thirty percent of that of the Comparative Example. Accordingly, Example has high effect of damping vibration.

As mentioned above, the weighted cable cap of the present invention can favorably prevent the vibration transmitted to the control cable from external and can be easily manufactured by the process of the invention.

What I claim is:

1. A weighted cable cap in combination with a control cable which includes an outer casing and an inner cable therein, said weighted cable cap comprising
   (A) a cable cap provided on one end thereof with a hole-W for inserting the outer casing, said hole-W having a bottom, and on the other end thereof with a hole-X for inserting the inner cable; said hole-X being perforated through said bottom so that said hole-W and hole-X are concentrically located with respect to each other, said cable cap being molded onto said outer casing; and
   (B) a weight having a hole-Y for inserting said outer casing and having means for fixing said weight onto one end of said cable cap so that said hole-W and hole-Y are concentrically located with respect to each other.

2. The weighted cable cap of claim 1, wherein said weight is made of lead metal or a lead alloy.

3. The weighted cable cap of claim 1, wherein a hole-Z for snugly inserting one end of the cable cap is formed on one end of said weight.

4. The weighted cable cap of claim 3, wherein a portion of hole-Z has an enlarged inside diameter.

5. The weighted cable cap of claim 3, wherein the outer surface of the cap has a flange having a surface engaging said means for fixing.

6. The weighted cable cap of claim 3, wherein an O-ring fitted to an outer surface of said outer casing is set on a bottom of said hole-Z.

7. The weighted cable cap of claim 1, wherein the inside diameter of said hole-Y is substantially equal to the outside diameter of said outer casing in at least certain area of the hole-Y.

8. The weighted cable cap of claim 7, wherein the inside diameter of said hole-Y gradually expands in a conical manner from said area of the hole-Y to the other end of the weight.

* * * * *